US010548334B2

(12) United States Patent
Cruz et al.

(10) Patent No.: US 10,548,334 B2
(45) Date of Patent: Feb. 4, 2020

(54) COCOA BUTTER SUBSTITUTE

(75) Inventors: Adriana Fernanda Cruz, Bogota (CO); Carlos Andres Alvarez, Bogota (CO)

(73) Assignee: Team Foods Colombia S.A., Bogota (CO)

( * ) Notice: Subject to any disclaimer, the term of this patent is extended or adjusted under 35 U.S.C. 154(b) by 1048 days.

(21) Appl. No.: 14/384,073

(22) PCT Filed: Jul. 17, 2012

(86) PCT No.: PCT/IB2012/001395
§ 371 (c)(1),
(2), (4) Date: Mar. 4, 2015

(87) PCT Pub. No.: WO2013/132285
PCT Pub. Date: Sep. 12, 2013

(65) Prior Publication Data
US 2015/0164102 A1    Jun. 18, 2015

Related U.S. Application Data

(60) Provisional application No. 61/609,153, filed on Mar. 9, 2012.

(30) Foreign Application Priority Data

May 7, 2012 (WO) .................. PCT/IB2012/001059

(51) Int. Cl.
*A23G 1/38* (2006.01)

(52) U.S. Cl.
CPC ............ *A23G 1/38* (2013.01); *A23V 2002/00* (2013.01)

(58) Field of Classification Search
CPC ......... A23G 1/38; A23G 1/36; A23V 2002/00
See application file for complete search history.

(56) References Cited

U.S. PATENT DOCUMENTS

| | | | |
|---|---|---|---|
| 4,839,192 A | 6/1989 | Sagi et al. | |
| 4,861,611 A | 8/1989 | Baba et al. | |
| 4,956,287 A | 9/1990 | Suzuki et al. | |
| 5,061,506 A | 10/1991 | Leach | |
| 5,268,191 A | 12/1993 | Crosby | |
| 5,279,846 A | 1/1994 | Okumura | |
| 5,405,639 A | 4/1995 | Pierce et al. | |
| 5,431,948 A | 7/1995 | Cain et al. | |
| 5,609,906 A | 3/1997 | Hokuyo et al. | |
| 5,667,837 A | 9/1997 | Broomhead et al. | |
| 5,849,353 A | 12/1998 | Baker et al. | |
| 5,932,275 A | 8/1999 | Nalur | |
| 6,153,236 A | 11/2000 | Wu et al. | |
| 6,156,370 A | 12/2000 | Huizinga et al. | |
| 6,210,739 B1 | 4/2001 | Nalur | |
| 6,228,417 B1 | 5/2001 | Hidaka et al. | |
| 6,630,192 B2 | 10/2003 | Sundram et al. | |
| 7,229,653 B2 | 6/2007 | Sundram et al. | |
| 7,923,050 B2 | 4/2011 | Akahane et al. | |
| 7,947,323 B2 | 5/2011 | Cleenewerck et al. | |
| 8,133,526 B2 | 3/2012 | Bach et al. | |
| 2008/0131564 A1 | 6/2008 | Nalur | |
| 2009/0029024 A1 | 1/2009 | McNeill et al. | |
| 2010/0196544 A1 | 8/2010 | Cleenewerck | |
| 2010/0215809 A1 | 8/2010 | 'tZand et al. | |
| 2010/0215810 A1 | 8/2010 | 'tZand et al. | |
| 2010/0215824 A1 | 8/2010 | Orthoefer et al. | |
| 2011/0111113 A1 | 5/2011 | De Muijnck | |
| 2011/0177227 A1 | 7/2011 | Cruz Serna et al. | |
| 2012/0040077 A1 | 2/2012 | Sakai et al. | |
| 2012/0058228 A1 | 3/2012 | Wales et al. | |

FOREIGN PATENT DOCUMENTS

| | | |
|---|---|---|
| CN | 102014646 A | 4/2011 |
| JP | 55114261 A | 9/1980 |
| JP | 8242765 A | 9/1996 |
| JP | 8298934 A | 11/1996 |
| JP | 9241673 A | 9/1997 |
| JP | 2000226598 A | 8/2000 |
| JP | 2001152182 A | 6/2001 |
| WO | 2011068274 A1 | 6/2011 |
| WO | 2011068291 A1 | 6/2011 |
| WO | 2011138034 A1 | 11/2011 |

OTHER PUBLICATIONS

Donna Berry: "Fat's Balancing Act", Food Product Design, Sep. 2011, pp. 1-4,(XP055054809 Retrieved from the Internet (D2) referenced in the International Preliminary Report of Patentability,). (Year: 2011).*
Nor Aini, I. and Miskandar, M. S. (2007), Utilization of palm oil and palm products in shortenings and margarines. Eur. J. Lipid Sci. Technol., 109: 422-432, doi: 10.1002/ejlt.200600232.
Berger, K. G. and Idris, Aini, Formulation of zero-trans acid shortenings and margarines and other food fats with products of the oil palm, Journal of the American Oil Chemists' Society, 82: 775-782, DOI: 10.1007/s11746-005-1143-9, http://www.springerlink.com/content/j5835821x3120152/.
Borhan Ros-Haniza et al., Enzymatic Interesterification of products for producting Low Calorie Cocoa Butter Substitutes, Journal of Applied Sciences 11 (22): 3750-3754. DOI: 10.3923/jas. 2011.3750. 3754.
Kim Byung Hee et al. Trans-Free Margarines Prepared with Canola Oil/Palm Stearin/Palm Kernel Oil-Based Structured Lipids, J. Agric. Food Chem., 2008, 56 (17), pp. 8195-8205, DOI: 10.1021/jf801412v, http://pubs.acs.org/doi/abs/10.1021/jf801412v.
Lipp M. and Anklam E., Review of cocoa butter and alternative fats for us ein chocolate—Part A. Compositional data, Elsevier—Food Chemistry 1998, 1 (62):73-97.
Smith Kevin W. et al., Nature and Composition of Fat Bloom from palm Kernel Stearin and Kydrogenated Palm Kernel Stearing Compound Chocolates, J. Agric. Food Chem 2004, 52 (17): 5539-5544, DOI: 10.1021/049401e.

* cited by examiner

*Primary Examiner* — Subbalakshmi Prakash
(74) *Attorney, Agent, or Firm* — Greenberg Traurig, LLP

(57) ABSTRACT

A trans-fat free cocoa butter substitute and its production process which has a lower quantity of saturated fatty acids than cocoa butter, common cocoa butter substitutes, and lauric fats, for coating and molding applications in chocolate products with adequate texture, gloss, and melting profile characteristics, and a good speed of crystallization during a cooling process without tempering.

7 Claims, No Drawings

COCOA BUTTER SUBSTITUTE

COPYRIGHT NOTIFICATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND OF THE INVENTION

There is a correlation between the consumption of saturated fats and trans-fats with an increase of "bad" cholesterol (low density cholesterol or LDL) and a possible increase risk of cardiovascular disease. With the rising popularity of healthy food options, there is a emerging trend to limit the content of saturated fats and trans-fats in the foods we consume, and in particular in chocolate and cocoa confectionary products.

SUMMARY OF THE INVENTION

The foregoing and/or other aspects and utilities of the present invention may be achieved by providing a cocoa butter substitute ("CBS"), including 2% or less trans-fatty acids, based on a total amount of fatty acids in the CBS, between 35% and 60% saturated fatty acid content, based on the total amount of fatty acids in the CBS, the saturated fatty acid content of the CBS includes between 8% and 16% lauric acid content, between 2% and 6% myristic acid content, between 9% and 15% palmitic acid content, and between 14% and 21% stearic acid content, between 40% and 65% unsaturated fatty acid content, based on the total amount of fatty acids in the CBS, the unsaturated fatty acid content of the CBS includes between 34% and 54% oleic acid content, 16% or less linoleic acid content, 8% or less linolenic acid content, between 30% and 55% of a hydrogenated and interesterified fat mixture of lauric and non-lauric vegetable oils, based on a total weight of the CBS, the fat mixture includes between 50% and 65% of at least one of a palm kernel oil or its fractions and coconut oil or its fractions, based on a total weight of the fat mixture, and between 35% and 50% of a palm oil or its fractions, based on the total weight of the fat mixture, between 45% and 65% of a monounsaturated and/or polyunsaturated vegetable oil composition, based on a total weight of the CBS, the vegetable oil includes at least one of sunflower oil, safflower oil, low erucic rapeseed oil, canola oil, soy bean oil, high oleic sunflower oil, high oleic safflower oil, high oleic rapeseed oil, high oleic canola oil, high oleic soy bean oil, palm fractions and hybrid palm oil, and olive oil, and oleic acid includes 52% or more of the fatty acid content, based on the total fatty acid content of the vegetable oil, and 6% or less of a hardstock fat including at least one of a fully hydrogenated soybean and a fully hydrogenated palm oil, a solid fat content of the CBS is at least one of between 35% to 60% at 10 degrees Celsius, between 25% to 45% at 20 degrees Celsius, between 10% to 30% at 30 degrees Celsius, 18% or less at 35 degrees Celsius, and 10% or less at 40 degrees Celsius, and a slip melting point of the CBS is between 37 and 44 degrees Celsius, and when the CBS is used as a cocoa butter substitute in a test chocolate composition, the test chocolate composition has an enrobing crystallization residence time of 5 minutes or less when applied at 45-50 degrees Celsius and subject to a 4 meter cooling tunnel at between 5 and 8 degrees Celsius and, based on a total weight of the test chocolate composition, the test chocolate composition includes between 26% and 36% CBS, between 40% and 50% sugar, between 4% and 14% semi-skimmed milk powder, between 5% and 25% cocoa powder, less than 0.8% lecithin, less than 0.5% PGPR, and trace amounts of vanilla extract.

In another embodiment the CBS includes 1% or less trans-fatty acids, based on the total amount of fatty acids in the CBS, between 40% and 50% saturated fatty acid content, based on the total amount of fatty acids in the CBS, the saturated fatty acid content of the CBS includes between 9% and 13% lauric acid content, between 3% and 5% myristic acid content, between 10% and 13% palmitic acid content, and between 14% and 19% stearic acid content, between 50% and 60% unsaturated fatty acid content, based on the total amount of fatty acids in the CBS, the unsaturated fatty acid content of the CBS includes between 35% and 50% oleic acid content, 15% or less linoleic acid content, 6% or less linolenic acid content, between 32% and 47% of the hydrogenated and interesterified fat mixture, between 53% and 63% of the monounsaturated and/or polyunsaturated vegetable oil composition, based on the total weight of the CBS, oleic acid includes 56% or more of the fatty acid content, based on the total fatty acid content of the vegetable oil, and 5% or less of the hardstock fat, the solid fat content of the CBS is at least one of between 36% to 47% at 10 degrees Celsius, between 26% to 37% at 20 degrees Celsius, between 15% to 24% at 30 degrees Celsius, 14% or less at 35 degrees Celsius, and 6% or less at 40 degrees Celsius, and the slip melting point of the CBS is between 39 and 43 degrees Celsius, and when the CBS is used as a cocoa butter substitute in a test chocolate composition, the test chocolate composition has an enrobing crystallization residence time of 5 minutes or less when applied at 45-50 degrees Celsius and subject to a 4 meter cooling tunnel at between 5 and 8 degrees Celsius and, based on a total weight of the test chocolate composition, the test chocolate composition includes 34% CBS, 42.4% sugar, 14% semi-skimmed milk powder, 9% cocoa powder, 0.5% lecithin, 0.1% PGPR, and trace amounts of vanilla extract.

In another embodiment the CBS further includes 3% or less of an emulsifier or additive.

In another embodiment the emulsifier or additive is at least one of a monoglyceride or triglyceride mixture of saturated fatty acids, sorbitan esters (STS/SMS), polyglycerol, and polyglycerol esters.

In another embodiment the test chocolate composition is applied without a tempering process.

In another embodiment, based on the total amount of fatty acids in the CBS, the unsaturated fatty acid content of the CBS includes 0.1% or less of palmitoleic acid, and 0.5% or less of gondoic acid.

The foregoing and/or other aspects and utilities of the present invention may be achieved by providing a method to manufacture the CBS, including combining a lauric fat with a non-lauric fat to form a fat mixture, the fat mixture includes 50% to 65% lauric fat and 35% to 50% non-lauric fat based on a total weight of the fat mixture, hydrogenating the fat mixture, interesterifiying the hydrogenated fat mixture, blending the interesterified fat mixture with a vegetable oil to form a blended fat, the vegetable oil includes 52% or more oleic acid based on a total amount of fatty acids in the vegetable oil, and the blended fat includes 45% to 65% vegetable oil and 30% to 55% hydrogenated and interesterified fat mixture, based on the total weight of the blended fat, and blending the blended fat with a hardstock fat to form the CBS, the CBS includes 6% or less hardstock fat based on the total weight of the CBS.

In another embodiment the method further includes adding 3% or less of an emulsifier or additive to the CBS.

In another embodiment the emulsifier or additive is at least one of a monoglyceride or triglyceride mixture of saturated fatty acids, sorbitan esters (STS/SMS), polyglycerol, and polyglycerol esters.

In another embodiment the method to manufacture the CBS includes blending the interesterified fat mixture with the vegetable oil to form the blended fat, the vegetable oil includes 56% or more oleic acid based on a total amount of fatty acids in the vegetable oil, and the blended fat includes 53% to 63% vegetable oil and 32% to 47% hydrogenated and interesterified fat mixture, based on the total weight of the blended fat, blending the blended fat with a hardstock fat to form the CBS, the CBS includes 5% or less hardstock fat based on the total weight of the CBS, and adding 2% or less of an emulsifier or additive to the CBS.

In another embodiment the fat mixture is chemically interesterified.

In another embodiment the fat mixture is enzymatically interesterified.

In another embodiment the lauric fat includes at least one of palm kernel oil or its fractions and coconut oil or its fractions and the non-lauric fat includes palm oil or its fractions or hybrids.

In another embodiment the vegetable oil includes at least one of a monounsaturated oil and a polyunsaturated oil.

In another embodiment the vegetable oil includes at least one of sunflower oil, safflower oil, low erucic rapeseed oil, canola oil, soy bean oil, high oleic sunflower oil, high oleic safflower oil, high oleic rapeseed oil, high oleic soy bean oil, palm fractions and hybrid palm oil, and olive oil.

In another embodiment the hardstock fat includes at least one of a fully hydrogenated soybean and a fully hydrogenated palm oil.

In another embodiment, based on the total amount of fatty acids in the CBS, a saturated fatty acid content of the CBS is between 35% and 60% and includes 2% or less trans-fatty acids, between 8% and 16% lauric acid content, between 2% and 6% myristic acid content, between 9% and 15% palmitic acid content, and between 14% and 21% stearic acid content, a unsaturated fatty acid content of the CBS is between 40% and 65% and includes between 34% and 54% oleic acid content, 16% or less linoleic acid content, and 8% or less linolenic acid content.

In another embodiment a solid fat content of the CBS is at least one of between 35% to 60% at 10 degrees Celsius, between 25% to 45% at 20 degrees Celsius, between 10% to 30% at 30 degrees Celsius, 18% or less at 35 degrees Celsius, and 10% or less at 40 degrees Celsius, and a slip melting point of the CBS is between 37 and 44 degrees Celsius.

In another embodiment, based on the total amount of fatty acids in the CBS, the saturated fatty acid content of the CBS is between 40% and 50% and includes 1% or less trans-fatty acids, between 9% and 13% lauric acid content, between 3% and 5% myristic acid content, between 10% and 13% palmitic acid content, and between 14% and 19% stearic acid content, the unsaturated fatty acid content of the CBS is between 50% and 60% and includes between 35% and 50% oleic acid content, 15% or less linoleic acid content, 6% or less linolenic acid content.

In another embodiment the solid fat content of the CBS is at least one of between 36% to 47% at 10 degrees Celsius, between 26% to 37% at 20 degrees Celsius, between 15% to 24% at 30 degrees Celsius, 14% or less at 35 degrees Celsius, and 6% or less at 40 degrees Celsius, and the slip melting point of the CBS is between 39 and 43 degrees Celsius.

DETAILED DESCRIPTION OF THE EMBODIMENTS

Reference will now be made in detail to the various embodiments of the present invention. The embodiments are described below to provide a more complete understanding of the components, processes and apparatuses of the present invention. Any examples given are intended to be illustrative, and not restrictive. Throughout the specification and claims, the following terms take the meanings explicitly associated herein, unless the context clearly dictates otherwise. The phrases "in some embodiments" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments of the present invention may be readily combined, without departing from the scope or spirit of the present invention.

As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Physical properties defined hereinafter are measured at 20 to 25 degrees Celsius (° C.) unless otherwise specified.

As used herein, the term saturated fatty acids means a fatty acid without double bonds, the term unsaturated fatty acid means a fatty acid with at least one (monounsaturated) or more (polyunsaturated) double bonds, and the term trans-fat means a trans-isomer (E-isomer) of a fatty acid.

As used herein, the term lauric fat means a fat having more than 35% lauric fatty acids, based on a total amount of fatty acids in the lauric fat, and the term non-lauric fat means a fat having less than 4% lauric fatty acids based on a total amount of fatty acids in the lauric fat. Examples of lauric fats include, but are not limited to, palm kernel oil and coconut oil. Examples of non-lauric fats include, but are not limited to, palm oil and cottonseed oil.

In one embodiment, the present invention provides a trans-fat free cocoa butter substitute with a low saturated fatty acid content usable in chocolate and cocoa confectionary products and a method to make the same.

In one embodiment, the cocoa butter substitute includes both unsaturated and saturated fatty acids and a content of trans-fat fatty acids low enough to be considered as a trans-fat free product under the U.S. Food and Drug Administration's ("FDA") Definitions of Nutrient Content Claims. In one example, the cocoa butter substitute has 0.5 grams or less trans-fats per 100 grams of cocoa butter substitute. In another example of the present invention, a trans-fatty acid content of the cocoa butter substitute is 2% or less based on a total amount of fatty acids in the cocoa butter substitute. In yet another example, a trans-fatty acid content of the cocoa butter substitute is 1% or less based on a total amount of fatty acids in the cocoa butter substitute. The fatty acid content in the cocoa butter substitute can be determined, for example, using American Oil Chemists' Society (AOCS) method Ce1-e91.

Table 1 illustrates the fatty acid content of two cocoa butter substitutes embodiments of the present invention as measured via AOCS method Ce1-e91.

TABLE 1

Fatty Acid Content of the Cocoa Butter Substitute

| Fatty acid name | | Sample 1 | Sample 2 |
|---|---|---|---|
| | | % in the whole cocoa butter substitute | |
| Saturated fatty acids | | | |
| Caproic acid | C6:0 | 0.04 | 0.01 |
| Caprylic acid | C8:0 | 0.76 | 0.62 |
| Capric acid | C10:0 | 0.77 | 0.66 |
| Lauric acid | C12:0 | 11.82 | 10.71 |
| Myristic acid | C14:0 | 4.33 | 4.04 |
| Palmitic acid | C16:0 | 12.17 | 12.14 |
| Margaric acid | C17:0 | 0.04 | 0 |
| Stearic acid | C18:0 | 17.79 | 18.06 |
| Arachidic acid | C20:0 | 0.31 | 0.32 |
| Behenic acid | C22:0 | 0.49 | 0.52 |
| Lignoceric acid | C24:0 | 0.19 | 0.2 |
| Total saturated fatty acid content in the composition (%) | | 48.71 | 47.28 |
| Unsaturated fatty acids | | | |
| Palmitoleic acid | C16:1 | 0.04 | 0 |
| Oleic acid | C18:1 | 45.15 | 46.69 |
| Linoleic acid | C18:2 | 5.71 | 5.68 |
| Gondoic acid | C20:1 | 0.17 | 0.16 |
| Linolenic acid | C18:3 | 0.13 | 0.11 |
| Total unsaturated fatty acid content in the composition (%) | | 51.07 | 52.53 |
| Total trans fatty acid content in the composition (%) | | 0.168 | 0.089 |

As illustrated in Table 1, in one embodiment of the present invention, the cocoa butter substitute has between 35% and 60% saturated fatty acid content and between 40% and 65% unsaturated fatty acid content based on the total fatty acid content of the cocoa butter substitute. In another embodiment, the cocoa butter substitute has between 40% and 50% saturated fatty acid content and between 50% and 60% unsaturated fatty acid content, based on the total amount of fatty acids in the cocoa butter substitute. In other embodiments of the invention, the saturated fatty acid content is less than 50%, and the unsaturated fatty acid content is more than 50%. In other embodiments of the present invention, the trans-fat fatty acid content was 0.17% or 0.09% based on the total amount of fatty acids in the cocoa butter substitute.

As illustrated in Table 1, in one embodiment of the present invention, the saturated fatty acids include between 8% and 16% lauric acid, between 2% and 6% myristic acid, between 9% and 15% palmitic acid, and between 14% and 21% stearic acid. In another embodiment of the present invention, the saturated fatty acids include between 9% and 13% lauric acid, between 3% and 5% myristic acid, between 10% and 13% palmitic acid, and between 14% and 19% stearic acid.

In one embodiment of the present invention, the cocoa butter substitute has a limited amount of other saturated fatty acids. For example, the saturated fatty acid content of the cocoa butter substitute may include 0.1% or less of caproic acid, 1% or less of caprylic acid, 1% or less of capric acid, 0.1% or less of margaric acid, 1% or less of arachidic acid, 1% or less of behenic acid, and 0.5% or less of lignoceric acid, based on the total amount of fatty acids in the cocoa butter substitute.

As illustrated in Table 1, in one embodiment of the present invention, the unsaturated fatty acids include between 34% and 54% oleic acid, 16% or less linoleic acid, and 8% or less linolenic acid. In another embodiment of the present invention, the unsaturated fatty acids include between 35% and 50% oleic acid, 15% or less linoleic acid, and 6% or less linolenic acid.

In another embodiment of the present invention, the cocoa butter substitute has limited amounts of other unsaturated fatty acids. For example, in one embodiment, the cocoa butter substitute includes 0.1% or less palmitoleic acid and 0.5% or less gondoic acid, based on a total fatty acids content in the cocoa butter substitute.

In one embodiment of the present invention, the cocoa butter substitute includes a hydrogenated and interesterified fat mixture of vegetable oils. In one embodiment, the fat mixture includes a mixture of hydrogenated and interesterified lauric and non-lauric vegetable oils. For example, in one embodiment, the cocoa butter substitute includes between 30% and 55% of the hydrogenated and interesterified fat mixture based on a total weight of the cocoa butter substitute. In another example, the cocoa butter substitute includes between 32% and 47% of the hydrogenated and interesterified fat mixture based on the total weight of the cocoa butter substitute. In one embodiment of the present invention, the fat mixture includes between 50% and 65% of at least one of palm kernel oil or its fractions and coconut oil or its fractions, based on a total weight of the fat mixture. In other embodiments, the fat mixture includes between 35% and 50% of palm oil or its fractions, based on a total weight of the fat mixture. For example, in one embodiment, the fat mixture includes between 50% and 65% of palm kernel oil and between 35% and 50% of palm oil.

In one embodiment of the present invention, the cocoa butter substitute includes a monounsaturated or polyunsaturated vegetable oil composition. For example, in one embodiment, the cocoa butter substitute includes between 45% and 65% of the monounsaturated or polyunsaturated vegetable oil composition, based on the total weight of the cocoa butter substitute. In another example, the cocoa butter substitute includes between 53% and 63% of the monounsaturated or polyunsaturated vegetable oil composition. In one embodiment, the monounsaturated or polyunsaturated vegetable oil composition includes at least one of sunflower oil, safflower oil, low erucic rapeseed oil, canola oil, soy bean oil, high oleic versions of the same, palm fractions and hybrid palm oil, and olive oil. In one embodiment of the invention, the monounsaturated or polyunsaturated vegetable oil composition includes 52% or more oleic acid, based on a total fatty acid content of the monounsaturated or polyunsaturated vegetable oil composition. In another embodiment, the monounsaturated or polyunsaturated vegetable oil composition includes 56% or more oleic acid.

In one embodiment of the present invention, the cocoa butter substitute includes a hardstock fat. For example, in one embodiment, the cocoa butter substitute includes 6% or less hardstock fat, based on the total weight of the cocoa butter substitute. In another example, the cocoa butter substitute includes 5% or less hardstock fat. In one embodiment, the hardstock fat includes at least one of a fully hydrogenated soybean oil and a fully hydrogenated palm oil.

In one embodiment of the present invention, the cocoa butter substitute includes a at least one of an emulsifier and an additive. For example, in one embodiment, the cocoa butter substitute includes 3% or less of an emulsifier or an additive, based on the total weight of the cocoa butter substitute. In another example, the cocoa butter substitute includes 2% or less of an emulsifier or an additive. In one embodiment, the emulsifier or additive may include monoglyceride and triglyceride mixtures of saturated fatty acids, sorbitan esters (STS/SMS), polyglycerol, and polyglycerol esters.

In one embodiment of the present invention, a solid fat content of the cocoa butter substitute is between 35% and 60% at 10 degrees Celsius, between 25% and 45% at 20 degrees Celsius, between 10% to 30% at 30 degrees Celsius, 18% or less at 35 degrees Celsius, and 10% or less at 40 degrees Celsius. In another embodiment, the solid fat content of the cocoa butter substitute is between 36% and 47% at 10 degrees Celsius, between 26% and 37% at 20 degrees Celsius, between 15% to 24% at 30 degrees Celsius, 14% or less at 35 degrees Celsius, and 6% or less at 40 degrees Celsius. The solid fat content of the cocoa butter substitute can be determined, for example, using AOCS method Cd16-81.

In one embodiment of the present invention, a slip melting point of the cocoa butter substitute is between 37 and 44 degrees Celsius. In another embodiment of the present invention, the slip melting point is between 39 and 43 degrees Celsius. The slip melting point of the cocoa butter substitute can be determined, for example, using AOCS method Cd3-25 or AOCS method CC1-25.

In one embodiment of the present invention, the cocoa butter substitute can be used as a constituent of a chocolate composition or cocoa confectionary product. In one example, a chocolate composition includes cocoa powder, sugar, and a fat. In another example, depending on the type of chocolate, the chocolate composition can also include milk powder, such as skimmed milk powder, full cream milk power, or whey milk powder, lecithin, polyglycerol polyricinoleate, and vanilla extract. In another example, the sugar may include a low calorie sugar substitute, such as maltitol, SPLENDA®, and the like. Table 2 illustrates a sample chocolate composition.

TABLE 2

| Chocolate Composition | |
|---|---|
| Fat % | 26%-36% |
| Sugar % | 40%-50% |
| SKMP (Skimmed milk powder) % | 4%-14% |
| Cocoa powder % | 5%-25% |
| Lecithin % | 0.8% or less |
| PGPR (Polyglycerol polyricinoleate) % | 0.5% or less |
| Vanilla extract % | trace amounts |
| % of total chocolate composition by weight | 100% |

In an embodiment of the present invention, the cocoa butter substitute can be used as the fat in the chocolate composition to create a chocolate composition with 50% or less saturated fatty acid content. For example, the cocoa butter substitute can partially or completely replace the fat used in the chocolate composition. In one example, the chocolate composition includes 34% cocoa butter substitute, based on a total weight of the chocolate composition. In another example, depending on the application for the chocolate composition, the chocolate composition may include between 25% and 40% cocoa butter substitute, based on the total weight of the chocolate composition.

In an embodiment of the present invention, the chocolate composition has limited amounts of other fats constituents in the fat of the chocolate composition. For example, in one embodiment, the chocolate composition has 5% or less cocoa butter, including any residual cocoa butter present in the cocoa powder or any cocoa butter included in the cocoa butter substitute itself. In another embodiment of the present invention, the chocolate composition may include additional lauric fats or other cocoa butter substitutes, such as hydrogenated palm kernel oil, coconut oil, or their fractions, so long as the total content of saturated fatty acids in the chocolate composition is 50% or less.

In other embodiments of the present invention, the chocolate composition has 5% or less of cocoa butter replacements ("CBRs"), such as hydrogenated soybean, cottonseed, and palm oils, separate from any CBRs present in the in the cocoa butter substitute.

In other embodiments of the present invention, the chocolate composition has less than 1% each of cocoa butter, lauric fats, CBRs, and other CBSs separate from the residual cocoa butter present in the cocoa powder or any cocoa butter, lauric fats, CBRs, and other CBSs present in the cocoa butter substitute itself.

In one embodiment of the present invention, an amount of additional cocoa butter, lauric fats, CBRs, and other CBSs added to the chocolate composition, and separate from the residual cocoa butter present in the cocoa powder or any cocoa butter, lauric fats, CBRs, and other CBSs present in the cocoa butter substitute itself, is limited to maintain an overall saturated fatty acid content of the chocolate composition at 50% or less, based on the total fatty acid content of the chocolate composition. In another embodiment, the amount of additional cocoa butter, lauric fats, CBRs, and other CBSs added to the chocolate composition, and separate from the residual cocoa butter present in the cocoa powder or any cocoa butter, lauric fats, CBRs, and other CBSs present in the cocoa butter substitute itself, is limited to maintain an overall trans fatty acid content of the chocolate composition at 2% or less, based on a total fatty acid content in the chocolate composition.

In an embodiment of the present invention, when a chocolate composition is used for chocolate molding applications, the chocolate composition has between 25% to 35% cocoa butter substitute. In another embodiment of the present invention, the chocolate composition has between 30% to 33% cocoa butter substitute when used for chocolate molding applications. Examples of chocolate molding applications include the creating of tablets, figures, drops, and chips, and chocolate hard filings.

In an embodiment of the present invention, when the chocolate composition is used for chocolate coating applications, the chocolate composition has between 28% to 40% cocoa butter substitute. In another embodiment of the present invention, the chocolate composition has between 32% to 37% cocoa butter substitute when used for chocolate coating applications. Examples of chocolate coating applications include the use of the chocolate composition as couverture, and the coating of bakery products (such as cakes, rolls, and cookies), gums, and marshmallows.

In an embodiment of the present invention, when the chocolate composition is used in chocolate coating applications, the chocolate composition does not need tempering. For example, in one embodiment of the present invention, the chocolate composition can be coated on an edible food product at between 45 to 50 degrees Celsius without tempering to form a chocolate covered food product.

In one embodiment, although chocolate composition embodiments of the present invention may have between 40% and 50% saturated fatty acids (much less than chocolates using lauric fats or other CBSs with a high saturated fat content), chocolate composition embodiments of the present invention may exhibit similar speeds of crystallization in the cooling tunnel (at 5-8° C.) as chocolates using lauric fats, CBSs, and CBRs. For example, in an embodiment of the present invention, the chocolate composition has a enrobing crystallization residence time of 5 minutes or less when applied at between 45 and 50 degrees Celsius and subjected to a 4 meter cooling tunnel at between 5 to 8 degrees Celsius and with air circulation. In another embodiment of the present invention, the chocolate coating crystallized in 5 minutes or less when applied at between 45 and 50 degrees Celsius and subjected to a 4 meter cooling tunnel at between 5 to 8 degrees Celsius and with air circulation. In yet another embodiment of the present invention, the chocolate coating crystallized in 4 minutes when applied at between 45 and 50 degrees Celsius and subjected to a 4 meter cooling tunnel at between 5 to 8 degrees Celsius and with air circulation, which is comparable to the crystallization of chocolate coatings with lauric fats (and a total saturated fat content above 90%).

For example, an exemplary chocolate composition was prepared under an embodiment of the present invention by first mixing the cocoa butter substitute, sugar, SKMP, cocoa powder, and a trace amount of vanilla extract, and refining the mixture to up to a 30 micron particle size in a ball refiner mill at 50 degrees Celsius for 20 minutes. The lecithin and the PGPR where then added dissolved in a small amount of the cocoa butter substitute (~2%). The final composition of this exemplary chocolate composition is listed below in Table 3.

TABLE 3

Exemplary Chocolate Composition

| | |
|---|---|
| Fat % | 34 |
| Sugar % | 42.4 |
| SKMP (Skimmed milk powder) % | 14 |
| Cocoa powder % | 9 |
| Lecithin % | 0.5 |
| PGPR (Polyglycerol polyricinoleate) % | 0.1 |
| Vanilla extract % | trace |
| % of total chocolate composition by weight | 100 |

This exemplary chocolate composition was then applied, without a tempering process, at 45 to 50 degrees Celsius to various food products (cookies, cakes and marshmallows) and crystallized in a 4 meter cooling tunnel at between 5 and 8° C. with air circulation. The residence time in the tunnel was progressively decreased from 10 minutes to 4 minutes while noting the crystallization quality in the coated food products.

These chocolate covered food products had characteristics similar to that of chocolates with much higher saturated fat contents. For example, the food products coated with the chocolate composition prepared above had a gloss, a fingerprint resistance, a 30 degree Celsius heat resistance, and a gradual melting profile characteristics similar edible food products coated with a chocolate having 50% or more saturated fats. These chocolate covered products also crystallized in 4 minutes when subjected to a 4 meter cooling tunnel at between 5 and 8 degrees Celsius and with air circulation.

In an embodiment of the present invention, a method to produce the cocoa butter substitute includes combining lauric and non-lauric vegetable oils to obtain a fat mixture, hydrogenating this fat mixture, and then interesterifiying the hydrogenated fat mixture. In one embodiment of the present invention, the fat mixture is chemically interesterified. In another embodiment, the fat mixture is enzymatically interesterified. Subsequently, the interesterified fat mixture is blended with a monounsaturated or polyunsaturated vegetable oil composition having 52% or more oleic acid based on the total amount of fatty acids in the monounsaturated or polyunsaturated vegetable oil composition, and combining the resulting blended fat with a hardstock fat to form the cocoa butter substitute.

In one embodiment of the present invention, the lauric vegetable oil has more than 35% lauric fatty acids, based on a total amount of fatty acids in the lauric vegetable oil. In other examples, the lauric vegetable oil has between 40% and 60% lauric fatty acids, based on a total amount of fatty acids in the lauric vegetable oil.

In one embodiment of the present invention, the non-lauric vegetable oil has less than 4% lauric fatty acids, based on a total amount of fatty acids in the non-lauric vegetable oil. In one example, the non-lauric vegetable oil has 2% or less lauric fatty acids, based on a total amount of fatty acids in the non-lauric vegetable oil. In another example, the non-lauric vegetable oil has less than 1% or 0.5% lauric fatty acids, based on a total amount of fatty acids in the non-lauric vegetable oil. In another embodiment, the lauric vegetable oil has 2% or less of lauric fatty acids (C12) and other shot chain fatty acids (C4; C6; C8; and C10) based on a total amount of fatty acids in the non-lauric vegetable oil.

In one embodiment of the present invention, between 50% and 65% of a lauric fat is combined with between 35% and 50% of a non-lauric fat to form the fat mixture, based on a total weight of the fat mixture.

In an embodiment of the present invention, 30% to 55% of the hydrogenated and interesterified fat mixture is blended with 45% to 70% of the monounsaturated and/or polyunsaturated vegetable oil composition based on the total weight of the resulting blended fat.

In an embodiment of the present invention, the resulting blended fat is combined with 6% or less of a hardstock fat to form the cocoa butter substitute. In another embodiment of the present invention, the resulting blended fat is combined with 5% or less of a hardstock fat to form the cocoa butter substitute. In one embodiment of the present invention, the hardstock fat is at least one of a fully hydrogenated soybean oil and a fully hydrogenated palm oil.

In an embodiment of the present invention, the lauric fat may be at least one of palm kernel oil, its fractions or hybrids and coconut oil, its fractions or hybrids. In one example, the non-lauric fat may be palm oil, its fractions or hybrids.

In an embodiment of the present invention, the monounsaturated and/or polyunsaturated vegetable oil composition may include at least one of sunflower oil, safflower oil, low erucic rapeseed oil, canola oil, soy bean oil, high oleic versions of the same, palm fractions and hybrid palm oil, and olive oil. In one embodiment of the present invention, the monounsaturated and/or polyunsaturated vegetable oil composition includes 56% or more oleic acid, based on the total fatty acid content of the monounsaturated and/or polyunsaturated vegetable oil composition.

In an embodiment of the present invention, the hardstock fat may be a fully hydrogenated soybean oil. In other embodiments, the hydrogenated fat may be a fully hydrogenated palm oil.

In one embodiment of the present invention, the cocoa butter substitute has a saturated fatty acid content between 40% and 50% and an unsaturated fatty acid content between 50% and 60%. In another embodiment of the present invention, the saturated fatty acids may include between 9% and 13% lauric acid, between 3% and 5% myristic acid, between 10% and 13% palmitic acid, and between 14% and 19% stearic acid.

Cocoa Butter Substitute Production

Example 1

In one embodiment of the present invention, a cocoa butter substitute was produced using the following method.

For Example 1, a lauric fat was combined with a non-lauric fat to produce a fat mixture as follows: based on a total weight of the fat mixture, 60% of a refined, bleached, and deodorized ("RBD") palm kernel oil was blended with 40% of RBD palm oil.

The fat mixture was then fully hydrogenated to an iodine value <1 with a hydrogen pressure of 30 psi, at between 150 and 180 degrees Celsius and with a nickel catalyst presence in a concentration of 0.07%. The catalyst was then filtered and the hydrogenated fat mixture was then bleached.

The hydrogenated fat mixture was then chemically interesterified with sodium metoxide at a concentration of 0.2% at 92 degrees Celsius to reorganize the position of the fatty acids. This product was then filtered, bleached, and deodorized at 260 degrees Celsius to obtain the interesterified fat mixture. The composition and physical characteristics of this hydrogenated and interesterified fat mixture are listed in Table 4.

TABLE 4

Example 1: Composition of interesterified combined fat

| FATTY ACID COMPOSITION | |
|---|---|
| C 8:0 Caprylic acid | 1.95% |
| C10:0 Capric acid | 1.93% |
| C12:0-lauric acid | 27.97% |
| C14:0 Myristic acid | 10.09% |
| C16:0-Palmitic acid | 21.9% |
| C18:0- Stearic acid | 34.21% |
| C18:1- Oleic acid | 0.87% |
| Others | 1.20% |
| SLIP MELTING POINT ° C. | 43.2° C. |
| SOLID FAT CONTENT (NMR) | |
| N20 | 91.78 |
| N30 | 66.22 |
| N35 | 44.32 |
| N40 | 18.67 |
| FFA(free fatty acid as oleic acid) | 0.04 |

The hydrogenated and interesterified fat mixture of Table 4 was then blended with RBD high oleic sunflower oil. Blended was 54% RBD high oleic sunflower oil and 45% interesterified combined fat based on the total weight of the resulting blended fat. Finally, 1% (based on the total weight of the final cocoa butter substitute) of RBD fully hydrogenated palm oil (iodine value <2), was blended with the resulting blended fat to form the cocoa butter substitute described in Tables 5-6.

TABLE 5

Example 1: Cocoa butter substitute Characteristics

| ANALYSIS | RESULTS |
|---|---|
| Free fatty acid % (as oleic acid %) | 0.042 |
| Slip melting point, ° C. | 40.8 |

TABLE 5-continued

Example 1: Cocoa butter substitute Characteristics

| ANALYSIS | RESULTS |
|---|---|
| Solid fat content (NMR) | |
| N10 | 45.22 |
| N20 | 33.89 |
| N25 | 27.22 |
| N30 | 18.25 |
| N35 | 10.99 |
| N40 | 4.19 |

TABLE 6

Example 1: Fatty Acid Content of Cocoa butter substitute

| Fatty acid | % in the whole Cocoa butter substitute |
|---|---|
| Saturated fatty acids | |
| Caproic acid | 0.04 |
| Caprylic acid | 0.76 |
| Capric acid | 0.77 |
| Lauric acid | 11.82 |
| Myristic acid | 4.33 |
| Palmitic acid | 12.17 |
| Margaric acid | 0.04 |
| Stearic acid | 17.79 |
| Arachidic acid | 0.31 |
| Behenic acid | 0.49 |
| Lignoceric acid | 0.19 |
| Total saturated fatty acid content in the composition (%) | 48.71 |
| Unsaturated fatty acids | |
| Palmitoleic acid | 0.04 |
| Oleic acid | 45.15 |
| Linoleic acid | 5.71 |
| Gondoic acid | 0.17 |
| Linolenic acid | 0.13 |
| Total unsaturated fatty acid content in the composition (%) | 51.07 |

Although a few embodiments of the present invention have been shown and described, it will be appreciated by those skilled in the art that changes may be made in these embodiments without departing from the principles and spirit of the present invention, the scope of which is defined in the appended claims and their equivalents.

What is claimed is:

1. A cocoa butter substitute ("CBS"), comprising:
   2% or less trans-fatty acids, based on a total amount of fatty acids in the CBS;
   between 40% and 50% saturated fatty acid content, based on the total amount of fatty acids in the CBS, wherein the saturated fatty acid content of the CBS comprises:
   between 9% and 13% lauric acid content,
   between 3% and 5% myristic acid content,
   between 10% and 13% palmitic acid content, and
   between 14% and 19% stearic acid content;
   between 50% and 60% unsaturated fatty acid content, based on the total amount of fatty acids in the CBS, wherein the unsaturated fatty acid content of the CBS comprises:
   between 35% and 50% oleic acid content,
   15% or less linoleic acid content,
   6% or less linolenic acid content;

between 30% and 55% of a hydrogenated and interesterified fat mixture of lauric and non-lauric vegetable oils, based on a total weight of the CBS, wherein the fat mixture comprises:
between 50% and 65% of at least one of a palm kernel oil or its fractions and coconut oil or its fractions, based on a total weight of the fat mixture, and
between 35% and 50% of a palm oil or its fractions, based on the total weight of the fat mixture;
between 45% and 65% of a monounsaturated and/or polyunsaturated vegetable oil composition, based on a total weight of the CBS, wherein the vegetable oil comprises at least one of sunflower oil, safflower oil, low erucic rapeseed oil, canola oil, soy bean oil, high oleic sunflower oil, high oleic safflower oil, high oleic rapeseed oil, high oleic canola oil, high oleic soy bean oil, palm fractions and hybrid palm oil, and olive oil, and wherein oleic acid comprises 52% or more of the fatty acid content, based on the total fatty acid content of the vegetable oil; and
6% or less of a hardstock fat comprising at least one of a fully hydrogenated soybean and a fully hydrogenated palm oil,
wherein a solid fat content of the CBS is at least one of:
between 35% to 60% at 10 degrees Celsius,
between 25% to 45% at 20 degrees Celsius,
between 10% to 30% at 30 degrees Celsius,
18% or less at 35 degrees Celsius, and
10% or less at 40 degrees Celsius, and
wherein a slip melting point of the CBS is between 37 and 44 degrees Celsius, and
wherein in a test chocolate composition comprising the CBS used as a cocoa butter substitute, the test chocolate composition has an enrobing crystallization residence time of 5 minutes or less when applied, without a tempering process, at 45-50 degrees Celsius and subject to a 4 meter cooling tunnel at between 5 and 8 degrees Celsius and, and wherein, based on a total weight of the test chocolate composition, the test chocolate composition comprises:
between 26% and 36% CBS,
between 40% and 50% sugar,
between 4% and 14% semi-skimmed milk powder,
between 5% and 25% cocoa powder,
less than 0.8% lecithin,
less than 0.5% PGPR, and
trace amounts of vanilla extract.

2. The CBS of claim 1, wherein the CBS comprises:
1% or less trans-fatty acids, based on the total amount of fatty acids in the CBS;
between 32% and 47% of the hydrogenated and interesterified fat mixture;
between 53% and 63% of the monounsaturated and/or polyunsaturated vegetable oil composition, based on the total weight of the CBS, wherein oleic acid comprises 56% or more of the fatty acid content, based on the total fatty acid content of the vegetable oil; and
5% or less of the hardstock fat,
wherein the solid fat content of the CBS is at least one of:
between 36% to 47% at 10 degrees Celsius,
between 26% to 37% at 20 degrees Celsius,
between 15% to 24% at 30 degrees Celsius,
14% or less at 35 degrees Celsius, and
6% or less at 40 degrees Celsius, and
wherein the slip melting point of the CBS is between 39 and 43 degrees Celsius, and
wherein in a test chocolate composition comprising the CBS as a cocoa butter substitute, the test chocolate composition has an enrobing crystallization residence time of 5 minutes or less when applied, without a tempering process, at 45-50 degrees Celsius and subject to a 4 meter cooling tunnel at between 5 and 8 degrees Celsius and, and wherein, based on a total weight of the test chocolate composition, the test chocolate composition comprises:
34% CBS,
42.4% sugar,
14% semi-skimmed milk powder,
9% cocoa powder,
0.5% lecithin,
0.1% PGPR, and
trace amounts of vanilla extract.

3. The CBS of claim 2, further comprising 3% or less of an emulsifier.

4. The CBS of claim 3, wherein the emulsifier or additive is at least one of a monoglyceride or triglyceride mixture of saturated fatty acids, sorbitan esters (STS/SMS), polyglycerol, and polyglycerol esters.

5. The CBS of claim 4, wherein the test chocolate composition is applied without a tempering process.

6. The CBS of claim 5, wherein, based on the total amount of fatty acids in the CBS, the unsaturated fatty acid content of the CBS further comprises:
0.1% or less of palmitoleic acid, and
0.5% or less of gondoic acid.

7. The CBS of claim 6, wherein, based on the total amount of fatty acids in the CBS, the saturated fatty acid content of the CBS further comprises:
1% or less of arachidonic acid;
1% or less of behenic acid; and
0.5% or less of lignoceric acid.

* * * * *